United States Patent
Kikuchi et al.

(10) Patent No.: US 7,106,426 B2
(45) Date of Patent: Sep. 12, 2006

(54) METHOD OF INSPECTING OPTICAL WAVEGUIDE SUBSTRATE FOR OPTICAL CONDUCTION AT INCREASED SPEED AND ALSO INSPECTING OPTICAL WAVEGUIDE SUBSTRATE FOR CROSSTALK

(75) Inventors: Hideo Kikuchi, Tokyo (JP); Mikio Oda, Tokyo (JP); Hikaru Kouta, Tokyo (JP); Sakae Kitajo, Tokyo (JP); Yuzo Shimada, Tokyo (JP); Yoshio Matsumoto, Tokyo (JP); Shinichi Tamabayashi, Tokyo (JP)

(73) Assignee: NEC Toppan Circuit Solutions, Inc., Tokyo (JP)

( * ) Notice: Subject to any disclaimer, the term of this patent is extended or adjusted under 35 U.S.C. 154(b) by 160 days.

(21) Appl. No.: 10/322,484

(22) Filed: Dec. 19, 2002

(65) Prior Publication Data

US 2003/0117614 A1   Jun. 26, 2003

(30) Foreign Application Priority Data

Dec. 20, 2001   (JP)   ............................. 2001-388409

(51) Int. Cl.
*G01N 21/00*   (2006.01)

(52) U.S. Cl. ................................................... 356/73.1
(58) Field of Classification Search .................... None
See application file for complete search history.

(56) References Cited

U.S. PATENT DOCUMENTS

2003/0063852 A1 *   4/2003   Schiffer et al. ............... 385/33

FOREIGN PATENT DOCUMENTS

JP   11-304643 A   11/1999

* cited by examiner

Primary Examiner—Tu T. Nguyen
(74) Attorney, Agent, or Firm—Buchanan Ingersoll & Rooney P.C.

(57) ABSTRACT

There is disclosed a method of inspecting an optical waveguide substrate for optical conduction at an increased inspecting rate and also inspecting an optical waveguide substrate for cross-talk. According to the disclosed method, a laser beam is applied from a laser beam scanning optical system to one end face of an optical waveguide of an optical waveguide substrate which is an object to be inspected, and the laser beam emitted from the other end of the optical waveguide is detected by a CCD camera, which output detected result data. A light spot position confirming device compares the detected result data with stored data.

4 Claims, 12 Drawing Sheets

Fig. 3

X-DIRECTION →

Y-DIRECTION ↓

20

| | A | B | C | D | E |
|---|---|---|---|---|---|
| a | 0 | 0 | 0 | 0 | 0 |
| b | 0 | 0 | 9 | 0 | 0 |
| c | 0 | 0 | 0 | 0 | 0 |
| d | 0 | 8 | 0 | 0 | 0 |

Fig. 4

X-DIRECTION →

Y-DIRECTION ↓

21

| | A' | B' | C' | D' | E' |
|---|---|---|---|---|---|
| a' | 0 | 0 | 0 | 0 | 0 |
| b' | 0 | 0 | 8 | 0 | 0 |
| c' | 0 | 0 | 0 | 0 | 0 |
| d' | 0 | 7 | 0 | 0 | 1 |

METHOD OF INSPECTING OPTICAL WAVEGUIDE SUBSTRATE FOR OPTICAL CONDUCTION AT INCREASED SPEED AND ALSO INSPECTING OPTICAL WAVEGUIDE SUBSTRATE FOR CROSSTALK

BACKGROUND OF THE INVENTION

1. Field of the Invention

The present invention relates to a method of inspecting an optical waveguide substrate comprising an optical waveguide disposed on a substrate, and a method of inspecting an optical component mounted on an optical waveguide substrate.

2. Description of the Related Art

Optical communications technologies using light as an information transmitting medium have been in widespread usage. According to the optical communications technologies, an optical waveguide substrate comprising an optical waveguide disposed on a substrate is used for transmitting an optical signal which represents light modulated by an information signal, and the optical signal is transmitted along the optical waveguide substrate. The optical waveguide substrate comprises a core layer having a high refractive index and a cladding layer having a low refractive index, the core layer being surrounded by the cladding layer. An optical signal which has entered one end of the optical waveguide at a critical angle or a smaller angle is confined within the core layer and travels through the core layer while being repeatedly and totally reflected by the boundary between the core layer and the cladding layer, and finally leaves the optical waveguide from its other end.

Optical waveguide substrates used in the optical communications technologies are required to transmit an optical signal along the optical waveguide on the substrate with a high efficiency. In order for a completed optical waveguide substrate to meet such a requirement, the completed optical waveguide substrate is inspected for an amount of light that is conducted through the optical waveguide. Japanese laid-open patent publication No. 11-304643, for example, discloses a method of inspecting an amount of light that is conducted through an optical waveguide. The disclosed method is carried out using inspecting apparatus 100 shown in FIG. 1 of the accompanying drawings. As shown in FIG. 1, inspecting apparatus 100 comprises light source 104 disposed on the side of an end face of optical waveguide array 101 to be inspected and including semiconductor laser 102 and condensing lens 103, feed mechanism 105 comprising a drive motor, a feed screw, and a feed slide, for translating light source 104 along optical waveguide array 101, light detector 106 disposed on the side of the other end face of optical waveguide array 101, and personal computer 107 connected to light detector 106.

For inspecting an amount of light that is conducted through optical waveguide array 101 using inspecting apparatus 100, light source 104 is mechanically translated by feed mechanism 105 and, while light source 104 is being thus translated, it is energized to apply laser beam 108 to the end of optical waveguide array 101 to successively scan unit cells thereof. Light beams emitted from the other end of optical waveguide array 101 are detected by light detector 106, which generates a detected signal that is processed by personal computer 107 to inspect an amount of light that is conducted through optical waveguide array 101.

According to the above conventional inspecting method, since light source 104 is moved by feed mechanism 105 to apply the laser beam successively to the unit cells of optical waveguide array 101, the inspecting rate is low. Furthermore, because the light beams emitted from the respective unit cells of optical waveguide array 101 are detected altogether by light detector 106, it is difficult to inspect cross-talk.

Specifically, as shown in FIG. 1, inasmuch as while light source 104 is being mechanically translated by feed mechanism 105, light source 104 is energized to apply laser beam 108 to successively scan unit cells of optical waveguide array 101, it is time-consuming to scan optical waveguide array 101 and detect light beams emitted from optical waveguide array 101, resulting in a low inspecting rate.

According to the above conventional inspecting method, inasmuch as the light beams emitted from the respective unit cells of optical waveguide array 101 are detected altogether by light detector 106, as shown in FIG. 1, it is unable to distinguish the light beams emitted from the individual unit cells from each other, resulting in difficulty to inspect cross-talk.

SUMMARY OF THE INVENTION

It is therefore an object of the present invention to provide a method of inspecting an optical waveguide substrate at an increased inspecting rate and also inspecting an optical waveguide substrate for cross-talk.

To achieve the above object, there is provided a method of inspecting an optical waveguide substrate by applying a laser beam to one end face of an optical waveguide of the optical waveguide substrate which is an object to be inspected, detecting the laser beam emitted from the other end of the optical waveguide with an imaging camera to output detected image information, thereafter comparing the detected image information with stored reference image information to inspect the optical waveguide substrate. The method makes it possible to determine whether the conduction of the laser beam through the optical waveguide is acceptable or not and whether cross-talk in the optical waveguide is acceptable or not. Consequently, the optical waveguide can be inspected at an increased inspecting rate and can be inspected for cross-talk.

According to the present invention, there is also provided a method of inspecting a mounted optical component by reflecting a laser beam emitted from an inspecting optical waveguide on an optical waveguide substrate from the mounted optical component, and detecting the returned amount of reflected light of the laser beam to inspect a positional displacement of the mounted optical component. Therefore, a positional displacement of the mounted optical component can be inspected with a simple arrangement.

The above and other objects, features, and advantages of the present invention will become apparent from the following description with reference to the accompanying drawings which illustrate examples of the present invention.

BRIEF DESCRIPTION OF THE DRAWINGS

FIG. 3 is a diagram showing data stored in a major device of the inspecting apparatus shown in FIG. 2;

FIG. 4 is a diagram showing result data detected by the method of inspecting an optical waveguide substrate according to the first embodiment;

DETAILED DESCRIPTION OF THE PREFERRED EMBODIMENTS

1st Embodiment:

A method of inspecting an optical waveguide substrate according to a first embodiment of the present invention will be described below with reference to FIGS. 1 through 5.

Figure 1:
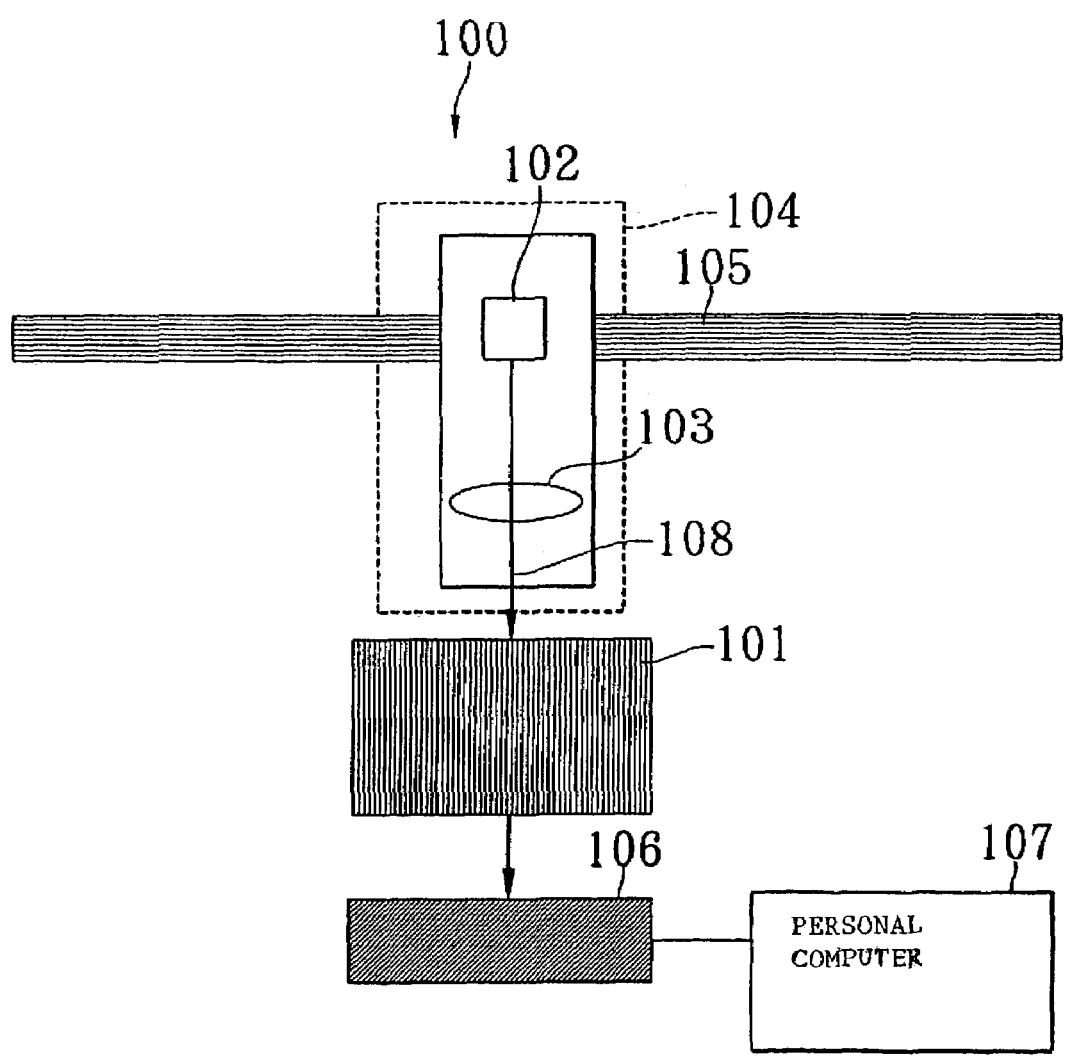
FIG. 1 is a view showing an inspecting apparatus used to carry out a conventional method of inspecting an optical waveguide substrate.
Figure 2:
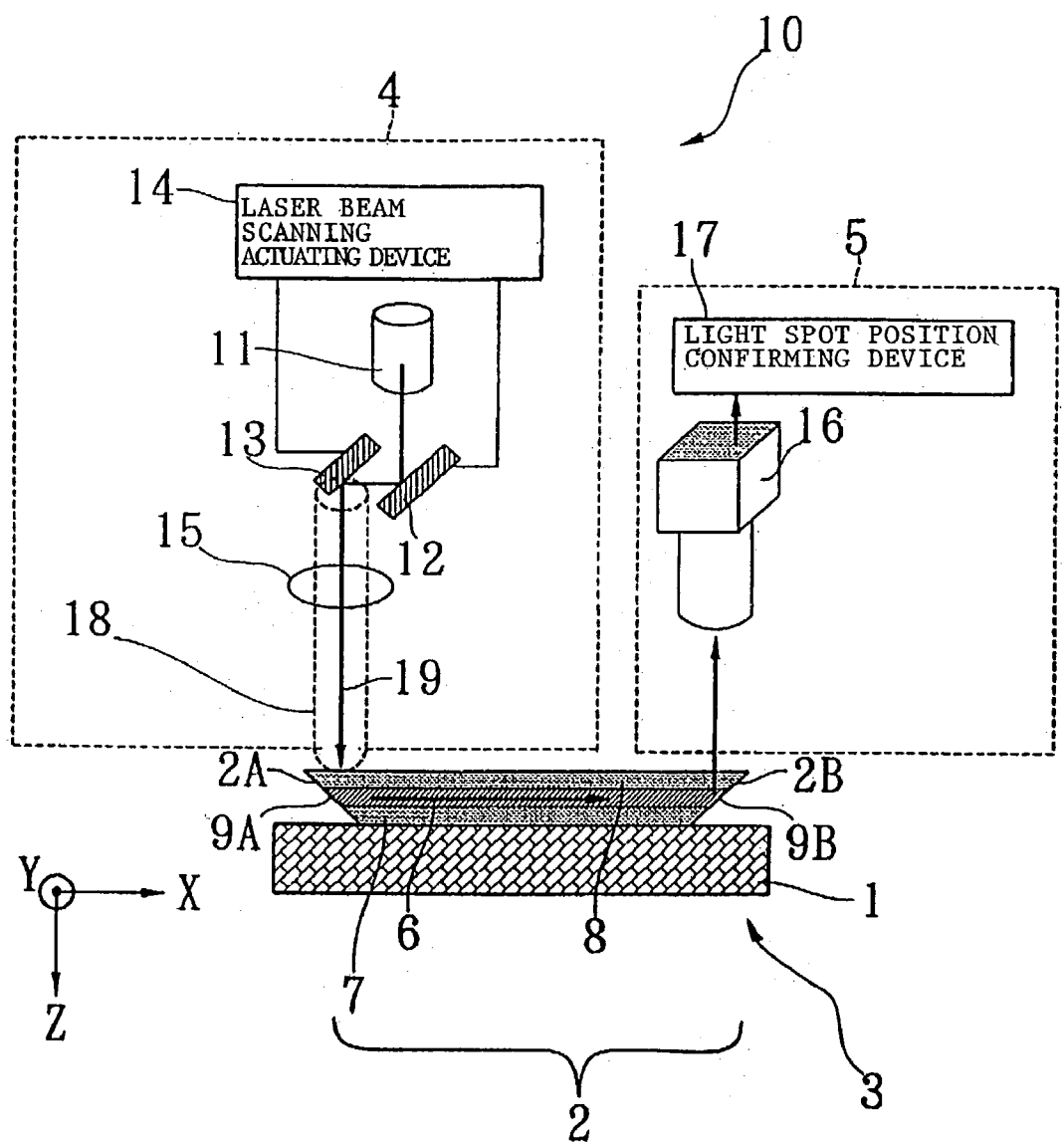
FIG. 2 is a view showing an inspecting apparatus used to carry out a method of inspecting an optical waveguide substrate according to a first embodiment of the present invention.

As shown in FIG. 2, inspecting apparatus 10 used to carry out a method of inspecting an optical waveguide substrate according to a first embodiment of the present invention comprises laser beam scanning optical system 4 disposed on the side of an end face of optical waveguide substrate 3 (an object to be inspected) which comprises optical waveguide 2 disposed on base substrate 1, and light detecting system 5 disposed on the side of other end face of optical waveguide substrate 3. Optical waveguide 2, which serves as a major component of optical waveguide substrate 3, comprises core layer 6 having a high refractive index and lower and upper cladding layers 7, 8, each having a low refractive index, sandwiching core layer 6 therebetween. End face 2A of optical waveguide 2 has first mirror surface 9A slanted at an angle of about 45° with respect to the horizontal direction indicated by the arrow X which is the longitudinal direction of optical waveguide 2, and other end face 2B of optical waveguide 2 has second mirror surface 9B slanted similarly to first mirror surface 9A. As described later on, laser beam scanning optical system 4 applies a laser beam to end face 2A of optical waveguide 2 in the direction indicated by the arrow Z, and a laser beam which has traveled through core layer 6 of optical waveguide 2 in the direction indicated by the arrow X is emitted from other end face 2B of optical waveguide 2 in the direction indicated by the arrow Z. The directions indicated by the arrows X, Y, Z shown in FIG. 2 are perpendicular to each other.

Laser beam scanning optical system 4 comprises laser beam source 11 for generating an inspecting laser beam, X-direction scanning galvanometer mirror 12 for deflecting a laser beam from laser beam source 11 in the direction indicated by the arrow X in order to apply the laser beam in the direction indicated by the arrow Z perpendicularly to the surface of optical waveguide substrate 3 to scan optical waveguide substrate 3, Y-direction scanning galvanometer mirror 13 for deflecting the laser beam, which has been deflected in the direction indicated by the arrow X, in the direction indicated by the arrow Y that is perpendicular to the direction indicated by the arrow X in order to apply the laser beam in the direction indicated by the arrow Z perpendicularly to the surface of optical waveguide substrate 3 to scan optical waveguide substrate 3, laser beam scanning actuating device 14 for actuating X-direction scanning galvanometer mirror 12 and Y-direction scanning galvanometer mirror 13, and lens 15 for converting the laser beam applied in the direction indicated by the arrow Z into parallel beam 18 having a predetermined spot diameter and applying parallel beam 18 along optical axis 19 in the direction indicated by the arrow Z to end face 2A of optical waveguide 2. X-direction scanning galvanometer mirror 12 and Y-direction scanning galvanometer mirror 13 are disposed near the focal point of lens 15. Lens 15 is used to direct parallel beam 18 to travel in the direction indicated by the arrow Z perpendicularly to the surface of optical waveguide substrate 3.

Light detecting system 5 comprises CCD camera (imaging camera) 16 for detecting a laser beam emitted in the direction indicated by the arrow Z from other end face 2B of optical waveguide 2, and outputting detected result data (detected image information) represented by the detected laser beam, and light spot position confirming device 17 for being supplied with the detected result data from CCD camera 16 and comparing the detected result data with stored data (reference image information) to determine whether the conduction of a laser beam through optical waveguide 2 is acceptable or not and whether cross-talk in optical waveguide 2 is acceptable or not.

A laser beam applied in the direction indicated by the arrow Z to end face 2A of optical waveguide 2 is oriented by first mirror surface 9A to travel in the direction indicated by the arrow X through core layer 6. Then, the laser beam is oriented by second mirror surface 9B to travel again in the direction indicated by the arrow Z, and emitted from other end face 2B of optical waveguide 2. At this time, CCD camera 16 detects the position in the XY plane of the laser beam emitted from the XY plane of optical waveguide substrate 3, recognizes the emitted beam at the detected position as a light spot, and outputs detected result data representing the position of the light spot.

As shown in FIG. 3, light spot position confirming device 17 stores data 20 representing desired reference amounts of light preset for respective grid areas divided from a zone to be inspected in the XY plane of optical waveguide 2, the grid areas being identified by respective addresses Aa, Bb, Cc, . . . For example, reference amount 8 of light is stored for a grid area identified by address Bd, and reference amount 0 of light is stored for a grid area identified by address Ed. The desired reference amounts of light preset for the respective grid areas may be changed depending on the object to be inspected.

As shown in FIG. 4, CCD camera 16 outputs amounts of light actually detected from optical waveguide 2 as detected result data 21 at respective areas in the XY plane which are specified by respective addresses A'a', B'b', C'c', . . . corresponding respectively to addresses Aa, Bb, Cc, . . . that identify the respective areas in the XY plane for stored data 20. For example, CCD camera 16 outputs amount 1 of light from the area specified by address C'b', amount 7 of light from the area specified address B'd', and amount 1 of light from the area specified by address E'd'. Light spot position confirming device 17 compares stored data 20 and detected result data 21 with each other to determine whether the conduction of a laser beam through optical waveguide 2 is acceptable or not and whether cross-talk in optical waveguide 2 is acceptable or not. Stored data 20 of the reference amounts of light for the emitted laser beams contain as many data as the number of laser beam positions in the XY plane.

The method of inspecting an optical waveguide substrate according to the first embodiment will be described below with reference to FIG. 5.

First, optical waveguide substrate 3 which is an object to be inspected is placed in a predetermined position in inspecting apparatus 10. In step S1 shown in FIG. 5, a laser beam emitted from laser beam source 11 of laser beam scanning optical system 4 is deflected in the direction indicated by the arrow X by X-direction scanning galvanometer mirror 12. In step S3, the laser beam is deflected in the direction indicated by the arrow Y by Y-direction scanning galvanometer mirror 13, and applied in the direction indicated by the arrow Z to scan optical waveguide substrate 3 in the XY plane thereof. The laser beam from Y-direction scanning galvanometer mirror 13 is converted by lens 15 into parallel beam 18 having a beam spot diameter of about 1 mm, which is applied along optical axis 19 in the direction indicated by the arrow Z to end face 2A of optical waveguide 2. Core layer 6 of optical waveguide 2 has a diameter of about 0.05 mm, for example. The laser beam applied to end face 2A of optical waveguide 2 is directed by first mirror surface 9A to travel in the direction indicated by the arrow X, i.e., within the XY plane, and then introduced into core layer 6. The laser beam which has been conducted through core layer 6 is directed by second mirror surface 9B to travel again in the direction indicated by the arrow Z, and then emitted from other end face 2B of optical waveguide 2.

After step S1, it is determined whether the scanning process needs to be ended or not. If YES, then the scanning process is ended in step S2. If NO, then control goes to a next step. Since the scanning process needs to be continued at this time, control goes to a next step.

At each spot where the laser beam applied to end face 2A scans the XY plane, CCD camera 16 detects the laser beam emitted from optical waveguide 2. CCD camera 16 recognizes the emitted beam at the detected position as a light spot, and outputs detected result data 21 representing the position of the light spot, as shown in FIG. 4.

After step S3, it is determined whether the scanning process needs to be ended or not in step S4. If YES, then control goes back to step S1. If NO, then control goes to a next step. Since the scanning process needs to be continued at this time, control goes to a next step.

In step S6, light spot position confirming device 17 reads detected result data 21 shown in FIG. 4 from CCD camera 16, and compares detected result data 21 with stored data 20 shown in FIG. 3. Based on the result of the comparison, light spot position confirming device 17 determines whether the conduction of the laser beam through optical waveguide 2 is acceptable or not in step S7 and then determines whether cross-talk in optical waveguide 2 is acceptable or not in step S8.

(1) Process of Determining Whether the Conduction of the Laser Beam Through Optical Waveguide 2 is Acceptable or Not (Step S7):

A reference amount Vt1 of light which serves as a basis for determining whether the conduction of the laser beam through optical waveguide 2 is acceptable or not, i.e., light-conduction determining reference amount Vt1 of light, is preset in each of the areas of stored data 20. If an amount of light equal to or higher than light-conduction determining reference amount Vt1 of light is detected, then it is judged that the conduction of the laser beam through optical waveguide 2 is acceptable. For example, light-conduction determining reference amount Vt1 of light is set to Vt1=5. Light spot position confirming device 17 compares stored data 20 and detected result data 21 with each other. Since the amounts of light detected in the areas specified by respective addresses C'b', B'd' are in excess of 5 as shown in FIG. 4, the conduction of the laser beams through optical waveguide 2 at those areas is judged as being acceptable. Since the amount of light detected in the area specified by address E'd' is less than 5 as shown in FIG. 4, the conduction of the laser beam through optical waveguide 2 at the area is judged as being unacceptable. The conduction of the laser beams through optical waveguide 2 at the other areas is similarly determined.

(2) Process of Determining Whether Cross-talk in Optical Waveguide 2 is Acceptable or Not (Step S8):

A reference amount Vt2 of light which serves as a basis for determining whether cross-talk in optical waveguide 2 is acceptable or not, i.e., cross-talk determining reference amount Vt2 of light, is preset in each of the areas of stored data 20. If an amount of light equal to or lower than cross-talk determining reference amount Vt2 of light is detected, then it is judged that cross-talk in optical waveguide 2 is acceptable. For example, cross-talk determining reference amount Vt2 of light is set to Vt2=1. Light spot position confirming device 17 compares stored data 20 and detected result data 21 with each other. Since the amounts of light detected in the areas specified by respective addresses C'b', B'd' are in excess of 1 as shown in FIG. 4, cross-talk in optical waveguide 2 at those areas is judged as being unacceptable. Since the amount of light detected in the area specified by address E'd' is 1 as shown in FIG. 4, cross-talk in optical waveguide 2 at the area is judged as being acceptable. Cross-talk in optical waveguide 2 at the other areas is similarly determined.

Control then goes back to step S3. If one scanning cycle in the direction indicated by the arrow Y is completed, then control returns via step S4 to step S1. If one scanning cycle in the direction indicated by the arrow X is completed, then the scanning process is put to an end.

According to the above method of inspecting an optical waveguide substrate, laser beam scanning optical system 4 including laser beam source 11, X-direction scanning galvanometer mirror 12, and Y-direction scanning galvanometer mirror 13 scans the XY plane with parallel beam 18 which is the laser beam traveling in the direction indicated by the arrow Z and applied to end face 2A of optical waveguide 2 of optical waveguide substrate 3 as the object to be inspected. Therefore, since the optical waveguide is not scanned by the light source which is mechanically translated as is the case with the conventional process, any position where the laser beam is applied to the optical waveguide can be selected at a high speed, so that the optical waveguide substrate can be inspected at a high speed.

According to the above method of inspecting an optical waveguide substrate, furthermore, since the laser beam emitted from other end face 2B of optical waveguide 2 is detected at each particular light spot position by CCD camera 16, but the laser beams emitted from the optical waveguide are not detected altogether as is the case with the conventional process, the laser beam emitted from any light spot position on the optical waveguide can be distinguished for inspecting cross-talk.

According to the above method of inspecting an optical waveguide substrate, laser beam scanning optical system 4 applies parallel laser beam 18 to end face 2A of optical waveguide 2, CCD camera 16 detects the laser beam emitted from other end face 2B of optical waveguide 2 and outputs detected result data 21, and thereafter light spot position confirming device 17 compares detected result data 21 with stored data 20. As a result, it is possible to determine whether the conduction of a laser beam through optical waveguide 2 is acceptable or not and whether cross-talk in optical waveguide 2 is acceptable or not. Consequently, optical waveguide 2 can be inspected at an increased inspecting rate and can be inspected for cross-talk.

2nd Embodiment:

A method of inspecting an optical waveguide substrate according to a second embodiment of the present invention will be described below with reference to FIGS. 6 and 7. The method of inspecting an optical waveguide substrate according to the second embodiment differs from the method according to the first embodiment in that it inspects an optical waveguide which has a structure different from the optical waveguide inspected by the method according to the first embodiment.

Figure 6:
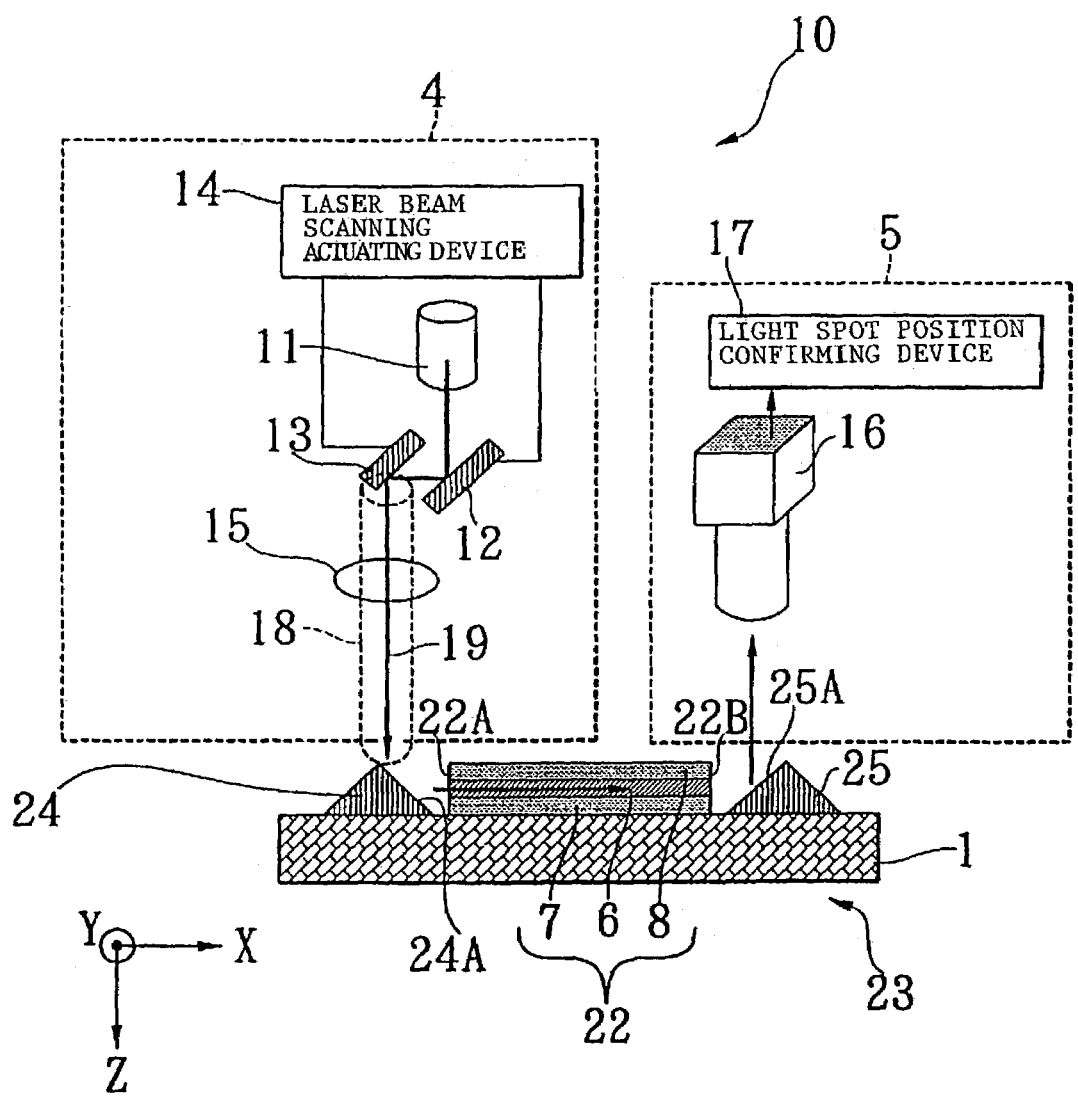
FIG. 6 is a view showing an inspecting apparatus used to carry out a method of inspecting an optical waveguide substrate according to a second embodiment of the present invention.
Figure 7:
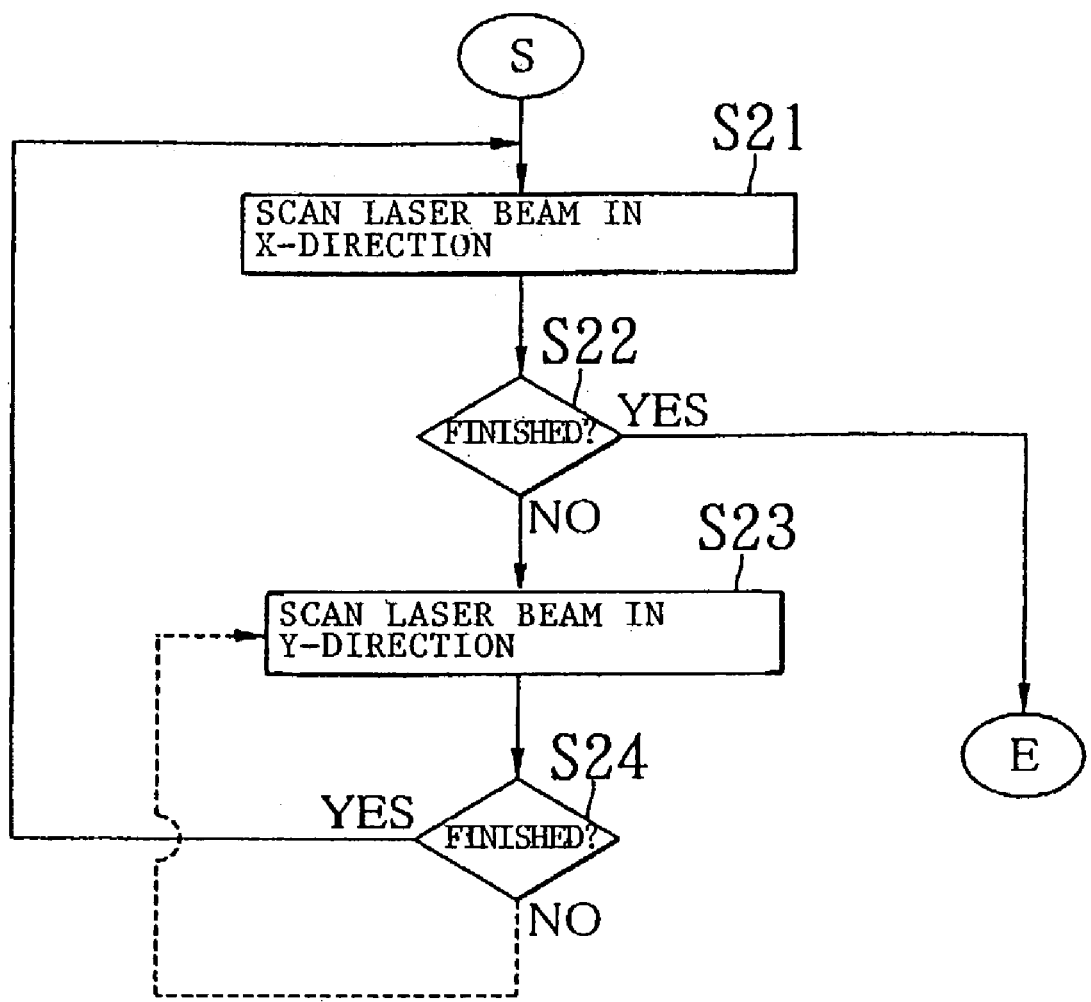
FIG. 7 is a flowchart of the method of inspecting an optical waveguide substrate according to the second embodiment.

As shown in FIG. 6, optical waveguide substrate 23 which is an object to be inspected by inspecting apparatus 10 comprises optical waveguide 22 disposed on base substrate 1 and having end faces 22A, 22B. End faces 22A, 22B have no slanted first and second mirror surfaces 2A, 2B as with the first embodiment. Instead, base substrate 1 supports thereon first pyramid mirror 24 disposed at end face 22A for directing a laser beam applied from laser beam scanning optical system 4 in the direction indicated by the arrow Z to end face 22A to travel in the direction indicated by the arrow X or within the XY plane into core layer 6, and second pyramid mirror 25 disposed at other end face 22B for directing the laser beam emitted from other end face 22B to travel again in the direction indicated by the arrow Z. Other details shown in FIG. 6 are essentially identical to those shown in FIG. 2. Those parts shown in FIG. 6 which are identical to those shown in FIG. 2 are denoted by identical reference characters, and will not be described in detail below.

The method of inspecting an optical waveguide substrate according to the second embodiment will be described below with reference to FIG. 7.

First, optical waveguide substrate 3 which is an object to be inspected is placed in a predetermined position in inspecting apparatus 10. In step S21 shown in FIG. 7, a laser beam emitted from laser beam source 11 of laser beam scanning optical system 4 is deflected in the direction indicated by the arrow X by X-direction scanning galvanometer mirror 12. In step S23, the laser beam is deflected in the direction indicated by the arrow Y by Y-direction scanning galvanometer mirror 13, and applied in the direction indicated by the arrow Z to scan optical waveguide substrate 23 in the XY plane thereof. The laser beam from Y-direction scanning galvanometer mirror 13 is converted by lens 15 into parallel beam 18 having a beam spot diameter of about 1 mm, which is applied along optical axis 19 in the direction indicated by the arrow Z to slanted surface 24A of first pyramid mirror 24. The laser beam is directed by slanted surface 24A to travel in the direction indicated by the arrow X or within the XY plane, and is applied to end face 22A of optical waveguide 22 where the laser beam is introduced into core layer 6. The laser beam which has been conducted through core layer 6 is emitted from other end face 22B of optical waveguide 22, and directed by slanted surface 25A of second pyramid mirror 25 to travel again in the direction indicated by the arrow Z.

Figure 5:
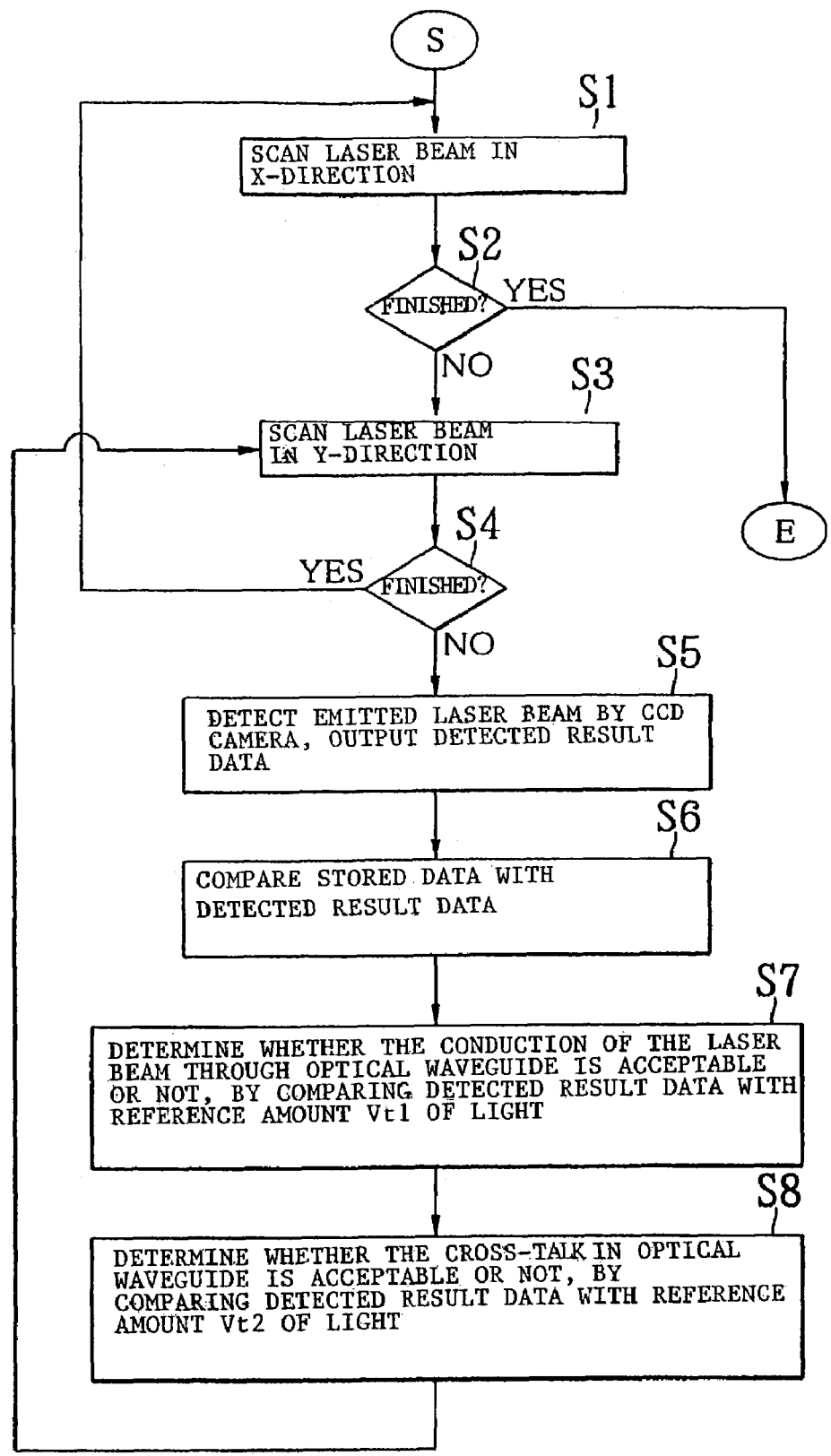
FIG. 5 is a flowchart of the method of inspecting an optical waveguide substrate according to the first embodiment.

Steps S22, S24 are similar to steps S2, S4 shown in FIG. 5. After step S24, steps which are substantially the same as the corresponding steps from step S5 shown in FIG. 5 are carried out to inspect optical waveguide 23. Those similar steps are omitted from illustration in FIG. 7, but represented by the broken line.

The method according to the second embodiment is applicable to the inspection of optical waveguide substrate 23 which does not have the first and second mirror surfaces 2A, 2B shown in FIG. 2 on their end faces 22A, 22B. Therefore, the method according to the second embodiment can be used to inspect a wider range of objects or optical waveguide substrates.

The method according to the second embodiment offers substantially the same advantages as the method according to the first embodiment. In addition, the method according to the second embodiment can be used to inspect a wider range of objects or optical waveguide substrates as it is applicable to the inspection of optical waveguide substrates which are not required to have end faces of a particular shape.

3rd Embodiment:

A method of inspecting an optical waveguide substrate according to a third embodiment of the present invention will be described below with reference to FIGS. 8 and 9. The method of inspecting an optical waveguide substrate according to the third embodiment differs from the method according to the first embodiment in that it inspects an optical waveguide substrate by changing the direction of a laser beam applied to an end face of the optical waveguide.

Figure 8:
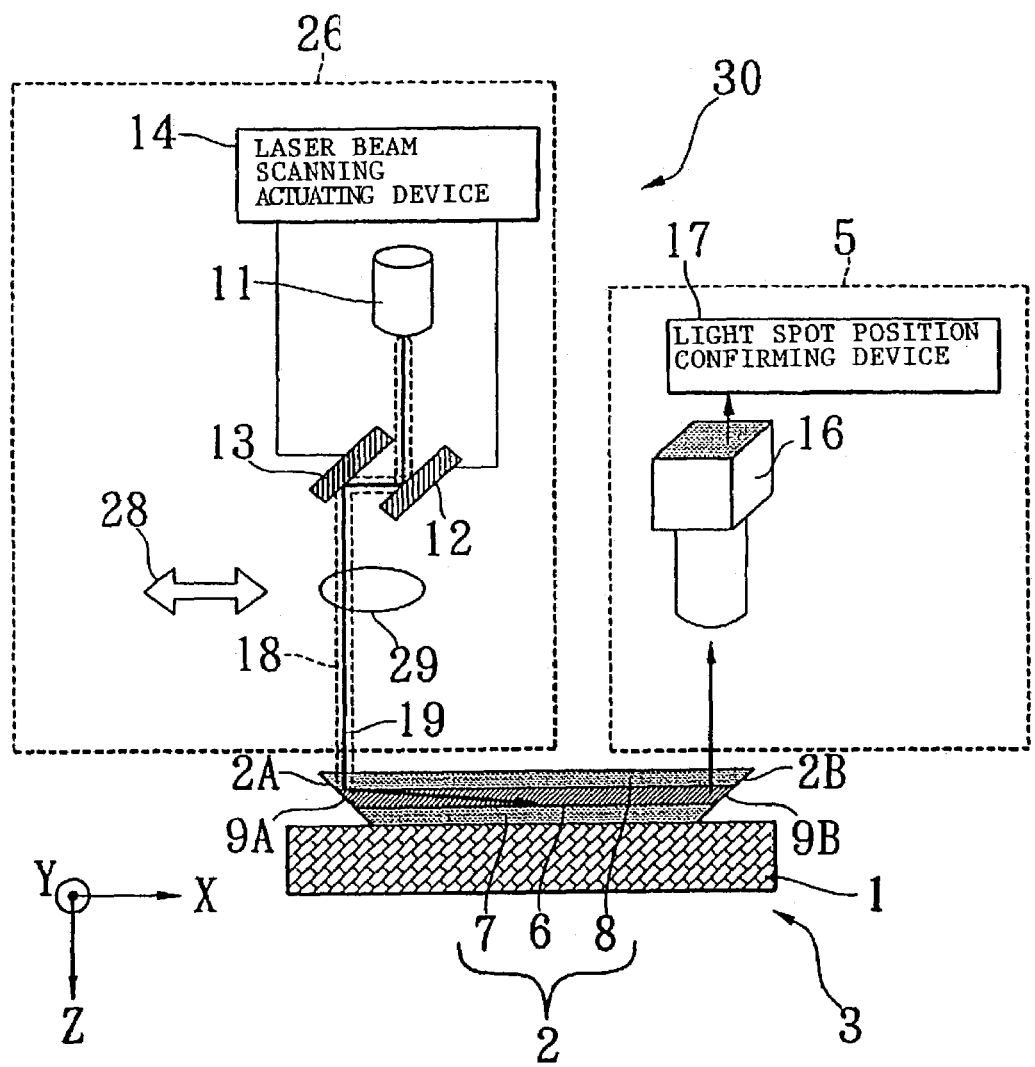
FIG. 8 is a view showing an inspecting apparatus used to carry out a method of inspecting an optical waveguide substrate according to a third embodiment of the present invention.

As shown in FIG. 8, an inspecting apparatus 30 used to carry out the method according to the third embodiment comprises laser beam scanning optical system 26 disposed on the side of an end face of optical waveguide substrate 3 (an object to be inspected) which comprises optical waveguide 2 disposed on base substrate 1, and light detecting system 5 disposed on the side of other end face of optical waveguide substrate 3. The details of light detecting system 5 are substantially the same as those of light detecting system 5 shown in FIG. 2 and will not be described in detail below.

Laser beam scanning optical system 26 comprises laser beam source 11 for generating an inspecting laser beam, X-direction scanning galvanometer mirror 12 for deflecting a laser beam from laser beam source 11 in the direction indicated by the arrow X in order to apply the laser beam in the direction indicated by the arrow Z perpendicularly to the surface of optical waveguide substrate 3 to scan optical waveguide substrate 3, Y-direction scanning galvanometer mirror 13 for deflecting the laser beam, which has been deflected in the direction indicated by the arrow X, in the direction indicated by the arrow Y that is perpendicular to the direction indicated by the arrow X in order to apply the laser beam in the direction indicated by the arrow Z perpendicularly to the surface of optical waveguide substrate 3 to scan optical waveguide substrate 3, laser beam scanning actuating device 14 for actuating X-direction scanning galvanometer mirror 12 and Y-direction scanning galvanometer mirror 13, and lens 29 for converting the laser beam applied in the direction indicated by the arrow Z into parallel beam 18 having a predetermined spot diameter and applying parallel beam 18 along optical axis 19 in the direction indicated by the arrow Z to end face 2A of optical waveguide 2. Lens 29 is positioned in a terminal portion of the path of the laser beam in laser beam scanning optical system 26. Lens 29 is controlled by a moving mechanism 28 to move in the directions indicated by the arrows X, Y to incline the direction of parallel beam 18 applied to optical waveguide substrate 3 away from the direction indicated by the arrow Z.

The method of inspecting an optical waveguide substrate according to the third embodiment will be described below with reference to FIG. 9.

First, optical waveguide substrate 3 which is an object to be inspected is placed in a predetermined position in inspecting apparatus 30. In step S33 shown in FIG. 9, a laser beam emitted from laser beam source 11 of laser beam scanning optical system 26 is deflected in the direction indicated by the arrow X by X-direction scanning galvanometer mirror 12. In step S33, the laser beam is deflected in the direction indicated by the arrow Y by Y-direction scanning galvanometer mirror 13, and applied in the direction indicated by the arrow Z to scan optical waveguide substrate 23 in the XY plane thereof. The laser beam from Y-direction scanning galvanometer mirror 13 is converted by lens 29 into parallel beam 18 having a beam spot diameter of about 1 mm, which is applied along optical axis 19 in the direction indicated by the arrow Z to end face 2A of optical waveguide 2. The laser beam is directed by first mirror surface 9A to travel in the direction indicated by the arrow X or within the XY plane, and then introduced into core layer 6.

In step S31, lens 29 has been moved in the XY plane by moving mechanism 28 to deflect the laser beam emitted from lens 29. When thus deflected, the laser beam applied to end face 2A of optical waveguide 2 and directed by first mirror surface 9A to travel in the direction indicated by the arrow X changes its direction within core layer 6 with respect to the surface of optical waveguide 2 as indicated by the arrow, unlike the first embodiment. The deflection of the direction of the laser beam in core layer 6 changes the transmission mode of the laser beam in optical waveguide 2. Specifically, since the laser beam traveling obliquely in core layer 6 is subject to a change in the transmittance (conductivity) of optical waveguide 2, such a change in the transmittance can be inspected.

The laser beam conducted obliquely through core layer 6 is transmitted in a multiple mode in which the laser beam is reflected by upper and lower cladding layers 7, 8. The laser beam is then directed by second mirror surface 9B to travel again in the direction indicated by the arrow Z, and emitted from other end face 2B of optical waveguide 2. The multiple-mode transmission based on the deflection of the direction of the laser beam in core layer 6 allows changes in the transmittance for the laser beam to be observed.

Steps S32, S34 are similar to steps S2, S4 shown in FIG. 5. After step S34, steps which are substantially the same as the corresponding steps from step S5 shown in FIG. 5 are carried out to inspect optical waveguide 3. Those similar steps are omitted from illustration in FIG. 9, but represented by the broken line.

In the method according to the third embodiment, lens 29 is moved in the XY plane to deflect the direction of the laser beam emitted from lens 29 to change the direction of the laser beam emitted from lens 29, thus changing the direction of the laser beam applied to optical waveguide 2. Therefore, it is possible to inspect changes in the transmittance of optical waveguide 2 for the laser beam depending on changes in the direction of the applied laser beam.

The method according to the third embodiment offers substantially the same advantages as the method according to the first embodiment. In addition, the method according to the third embodiment can be used to inspect changes in the transmittance of optical waveguide for the laser beam depending on changes in the direction of the applied laser beam.

4th Embodiment:

A method of inspecting an optical waveguide substrate according to a fourth embodiment of the present invention will be described below with reference to FIGS. 10 and 11. The method of inspecting an optical waveguide substrate according to the fourth embodiment differs from the method according to the third embodiment in that it inspects an optical waveguide which has a structure different from the optical waveguide inspected by the method according to the third embodiment.

Figure 10:
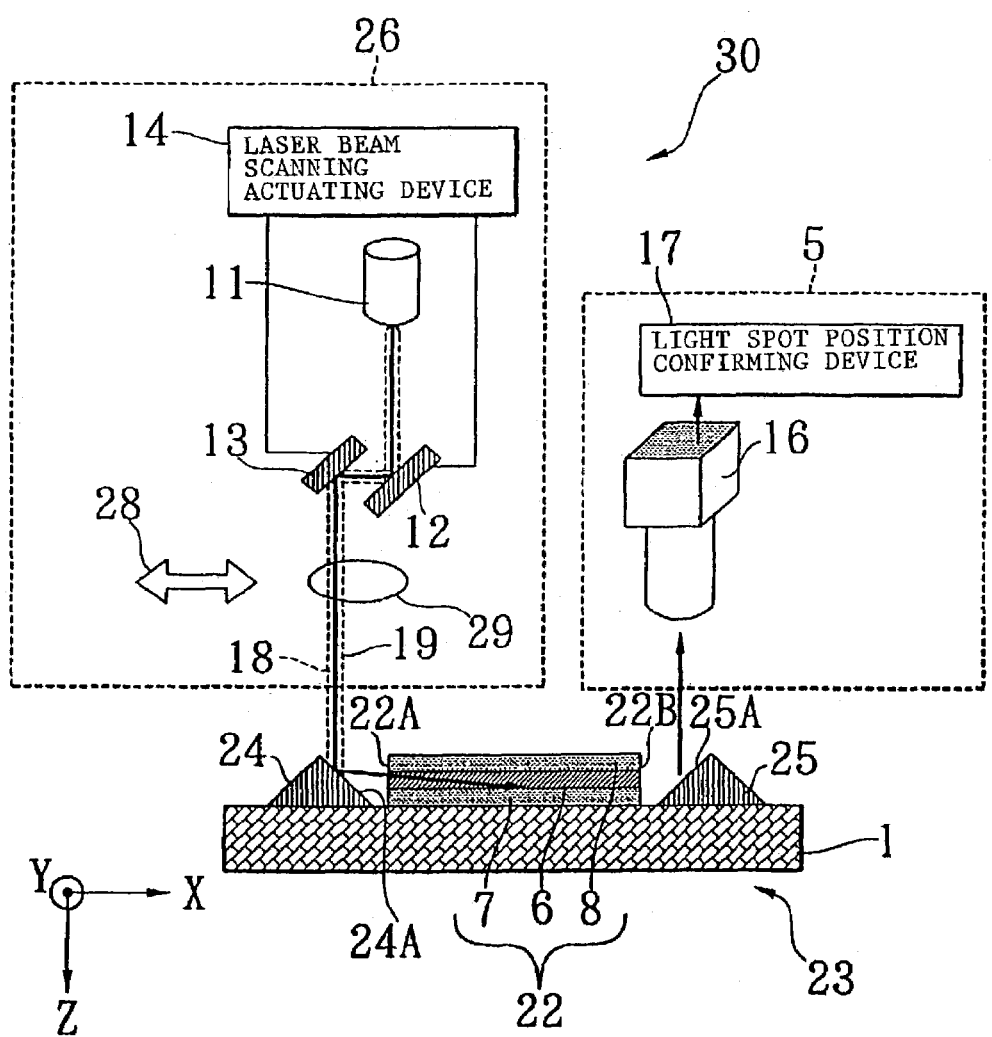
FIG. 10 is a view showing an inspecting apparatus used to carry out a method of inspecting an optical waveguide substrate according to a fourth embodiment of the present invention.
Figure 11:
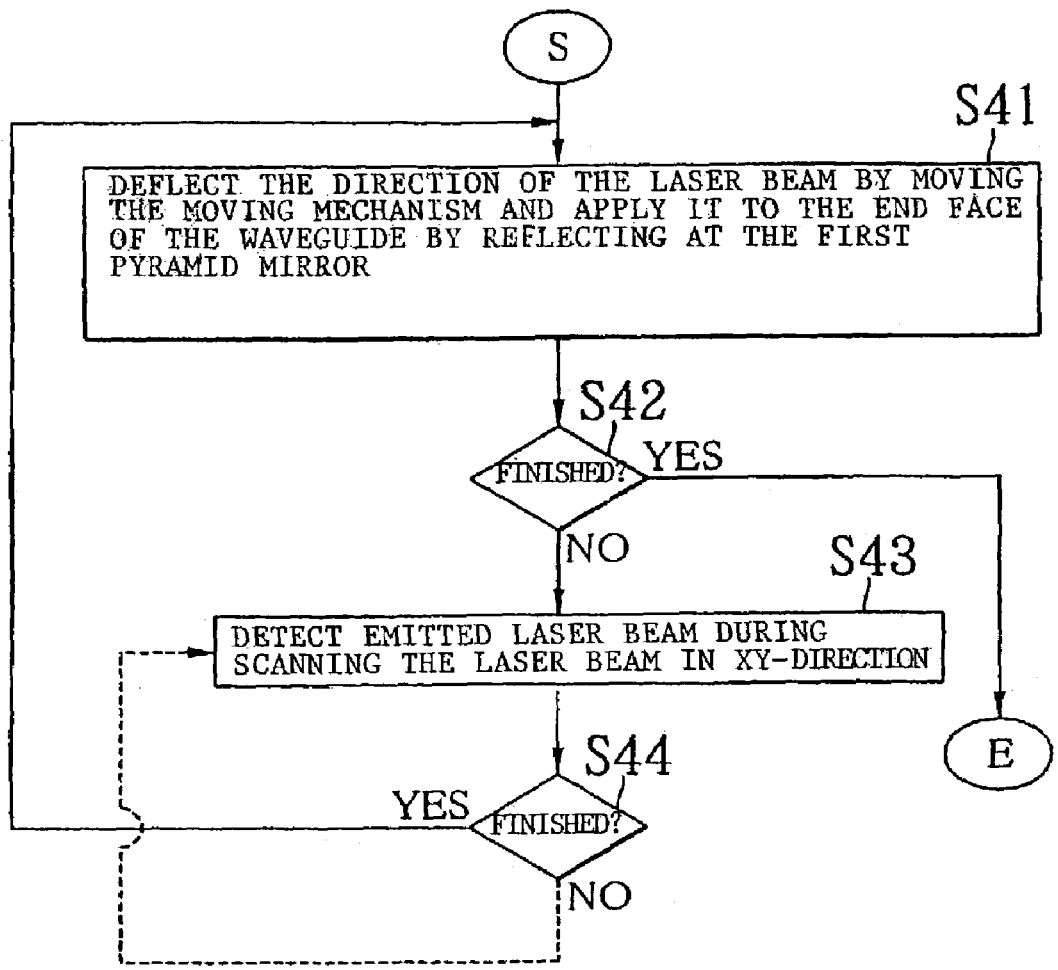
FIG. 11 is a flowchart of the method of inspecting an optical waveguide substrate according to the fourth embodiment.

As shown in FIG. 10, optical waveguide substrate 23 which is an object to be inspected by inspecting apparatus 30 comprises optical waveguide 22 disposed on base substrate 1 and having end faces 22A, 22B. End faces 22A, 22B have no slanted first and second mirror surfaces 2A, 2B as with the third embodiment. Instead, base substrate 1 supports thereon first pyramid mirror 24 disposed at end face 22A for directing a laser beam applied from laser beam scanning optical system 4 in the direction indicated by the arrow Z to end face 22A to travel in the direction indicated by the arrow X or within the XY plane into core layer 6, and second pyramid mirror 25 disposed at other end face 22B for directing the laser beam emitted from other end face 22B to travel again in the direction indicated by the arrow Z. Other details shown in FIG. 10 are essentially identical to those shown in FIG. 8. Those parts shown in FIG. 10 which are identical to those shown in FIG. 8 are denoted by identical reference characters, and will not be described in detail below.

The method of inspecting an optical waveguide substrate according to the fourth embodiment will be described below with reference to FIG. 11.

First, optical waveguide substrate 3 which is an object to be inspected is placed in a predetermined position in inspecting apparatus 30. In step S43 shown in FIG. 11, a laser beam emitted from laser beam source 11 of laser beam scanning optical system 26 is deflected in the direction indicated by the arrow X by X-direction scanning galvanometer mirror 12. In step S43, the laser beam is deflected in the direction indicated by the arrow Y by Y-direction scanning galvanometer mirror 13, and applied in the direction indicated by the arrow Z to scan optical waveguide substrate 23 in the XY plane thereof. The laser beam from Y-direction scanning galvanometer mirror 13 is converted by lens 29 into parallel beam 18 having a beam spot diameter of about 1 mm, which is applied along optical axis 19 in the direction indicated by the arrow Z to slanted surface 24A of first pyramid mirror 24. The laser beam is directed by slanted surface 24A to travel in the direction indicated by the arrow X or within the XY plane, and is applied to end face 22A of optical waveguide 22 where the laser beam is introduced into core layer 6.

In step S41, lens 29 has been moved in the XY plane by moving mechanism 28 to deflect the laser beam emitted from lens 29. When thus deflected, the laser beam applied to end face 22A of optical waveguide 22 and directed by first pyramid mirror 24 to travel in the direction indicated by the arrow X changes its direction within core layer 6 with respect to the surface of optical waveguide 22 as indicated by the arrow, unlike the first embodiment. The deflection of the direction of the laser beam in core layer 6 changes the transmission mode of the laser beam in optical waveguide 22. Specifically, since the laser beam traveling obliquely in core layer 6 is subject to a change in the transmittance of optical waveguide 22, such a change in the transmittance can be inspected.

The laser beam conducted obliquely through core layer 6 is transmitted in a multiple mode in which the laser beam is reflected by upper and lower cladding layers 7, 8. The laser beam which has been conducted through core layer 6 is emitted from other end face 22B of optical waveguide 22, and directed by slanted surface 25A of second pyramid mirror 25 to travel again in the direction indicated by the arrow Z.

Figure 9:
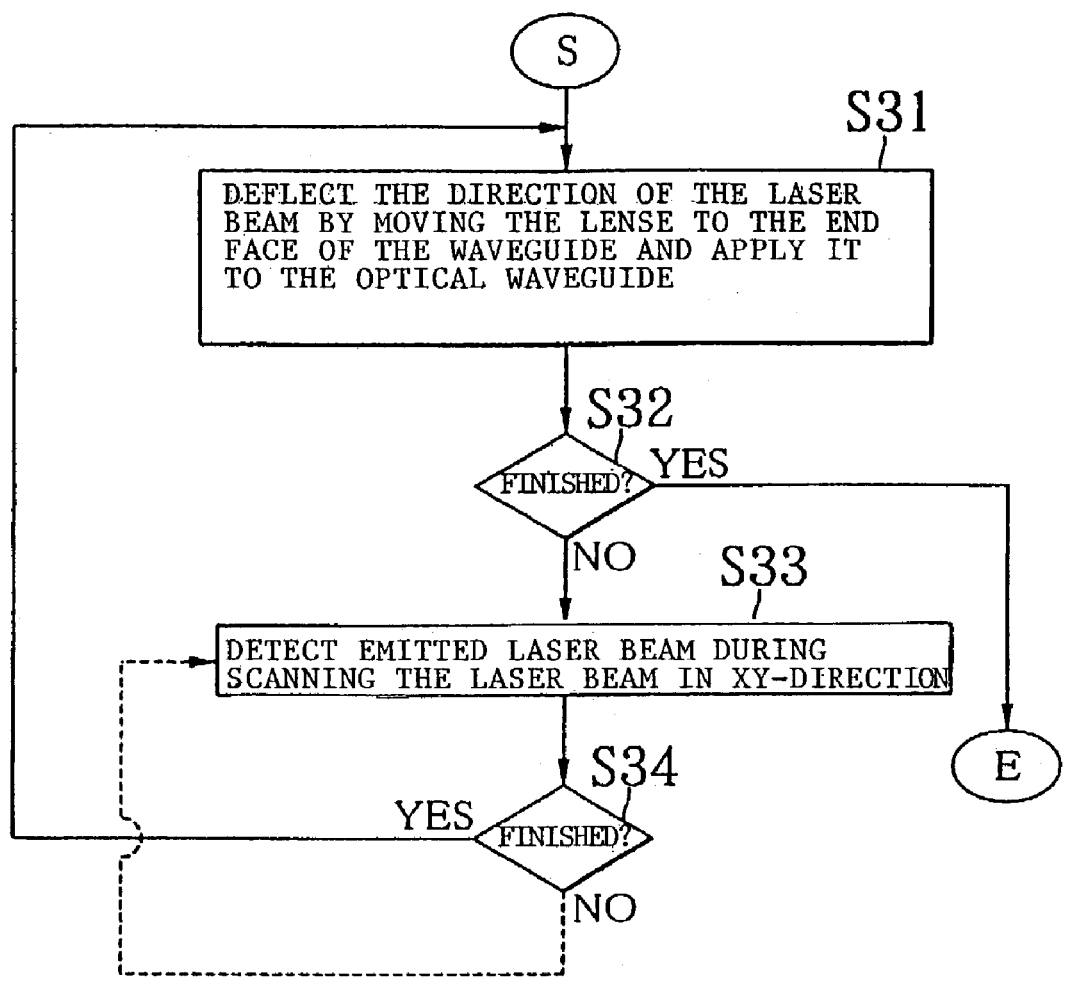
FIG. 9 is a flowchart of the method of inspecting an optical waveguide substrate according to the third embodiment.

Steps S42, S44 are similar to steps S32, S34 shown in FIG. 9. After step S44, steps which are substantially the same as the corresponding steps from step S5 shown in FIG. 5 are carried out to inspect optical waveguide 23. Those similar steps are omitted from illustration in FIG. 11, but represented by the broken line.

The method according to the fourth embodiment is applicable to the inspection of optical waveguide substrate 23 which does not have the first and second mirror surfaces 2A, 2B shown in FIG. 8 on their end faces 22A, 22B. Therefore, the method according to the fourth embodiment can be used to inspect a wider range of objects or optical waveguide substrates.

The method according to the fourth embodiment offers substantially the same advantages as the method according to the third embodiment. In addition, the method according to the fourth embodiment can be used to inspect a wider range of objects or optical waveguide substrates as it is applicable to the inspection of optical waveguide substrates which are not required to have end faces of a particular shape.

Figure 12:
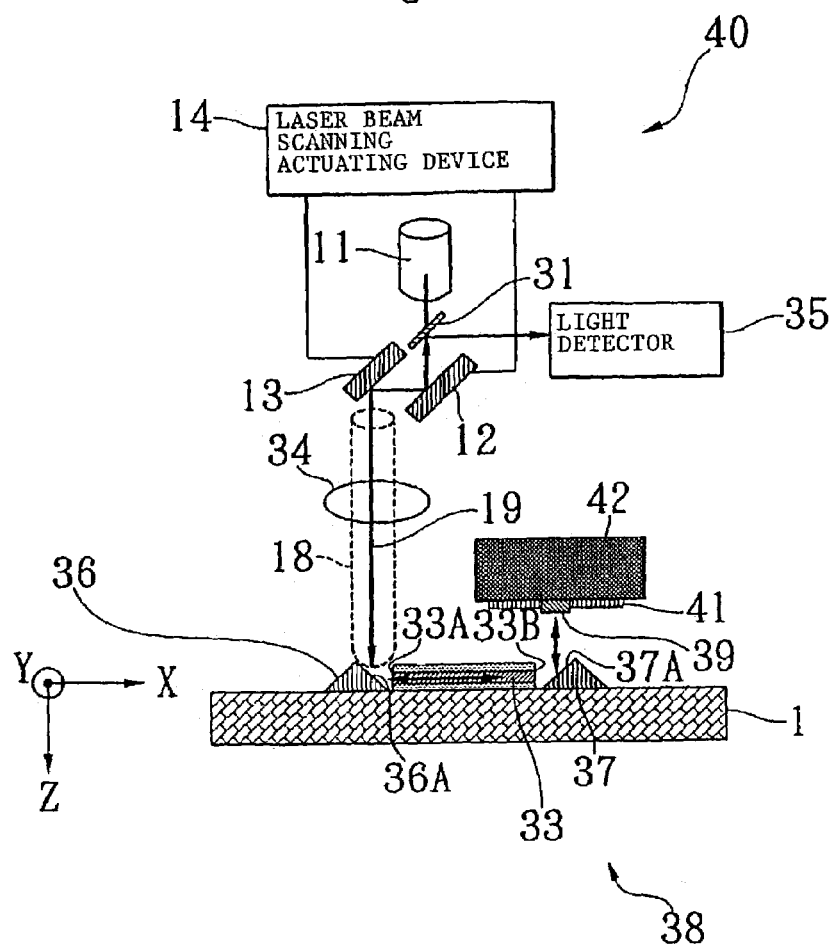
FIG. 12 is a view showing an inspecting apparatus used to carry out a method of inspecting a mounted optical component according to a fifth embodiment of the present invention.

5th Embodiment:

A method of inspecting a mounted optical component according to a fifth embodiment of the present invention will be described below with reference to FIGS. 12 through 14. The method of inspecting a mounted optical component according to the fifth embodiment differs from the methods according to the first through fourth embodiments in that a mounted optical component is inspected using an optical waveguide.

As shown in FIG. 40, an inspecting apparatus 40 that is used to carry out the method according to the fifth embodiment comprises laser beam source 11 for generating an inspecting laser beam, X-direction scanning galvanometer mirror 12 for deflecting a laser beam, emitted from laser beam source 11 and passing through half-silvered mirror 31, in the direction indicated by the arrow X in order to apply the laser beam in the direction indicated by the arrow Z perpendicularly to the surface of optical waveguide substrate 3 to scan optical waveguide substrate 3, Y-direction scanning galvanometer mirror 13 for deflecting the laser beam, which has been deflected in the direction indicated by the arrow X, in the direction indicated by the arrow Y that is perpendicular to the direction indicated by the arrow X in order to apply the laser beam in the direction indicated by the arrow Z perpendicularly to the surface of optical waveguide substrate 3 to scan optical waveguide substrate 3, laser beam scanning actuating device 14 for actuating X-direction scanning galvanometer mirror 12 and Y-direction scanning galvanometer mirror 13, lens 34 for converting the laser beam applied in the direction indicated by the arrow Z into parallel beam 18 having a predetermined spot diameter and applying parallel beam 18 along optical axis 19 in the direction indicated by the arrow Z to end face 33A of inspecting optical waveguide 33, and light detector 35 positioned in facing relation to the reflecting surface of half-silvered mirror 31.

Figure 13:
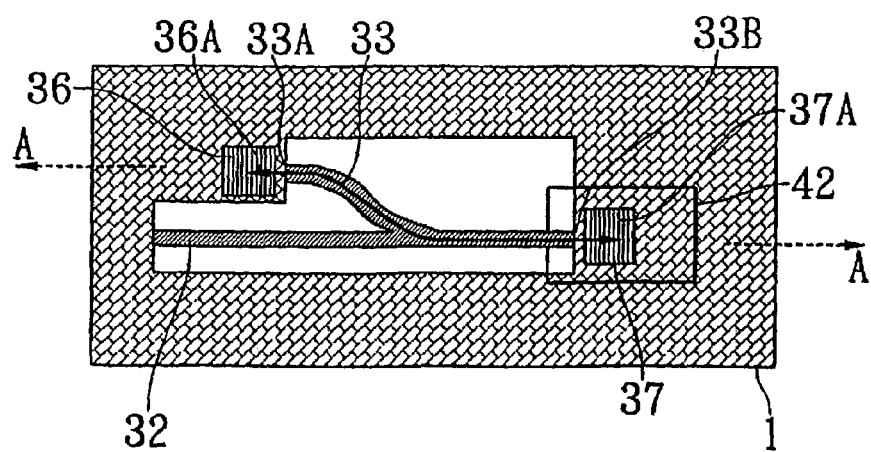
FIG. 13 is a plan view of an optical waveguide substrate which is an object to be inspected by the method according to the fifth embodiment.
Figure 14:
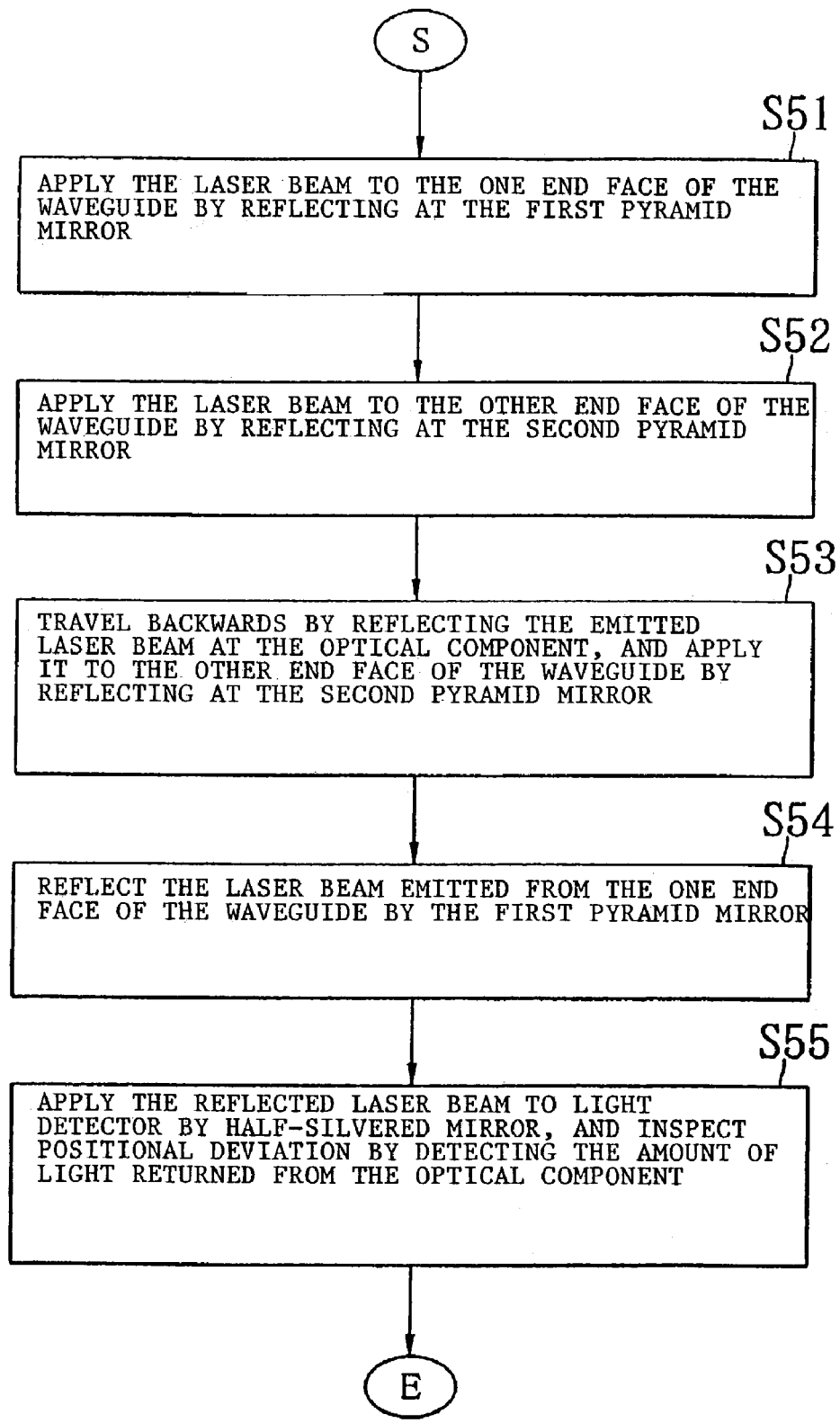
FIG. 14 is a flowchart of the method of inspecting a mounted optical component substrate according to the fifth embodiment.

As shown in FIG. 13, base substrate 1 supports thereon linear optical waveguide 32 for transmitting an optical signal, and curved inspecting optical waveguide 33 having a portion shared by linear optical waveguide 32 and branched from linear optical waveguide 32 at an intermediate position thereon. Base substrate 1 also supports thereon first pyramid mirror 36 disposed at end face 33A of inspecting optical waveguide 33 for directing a laser beam applied in the direction indicated by the arrow Z to end face 33A to travel in the direction indicated by the arrow X or within the XY plane into the core layer of optical waveguide 33, and second pyramid mirror 37 disposed at other end face 33B of optical waveguide 33 for directing the laser beam emitted from other end face 33B to travel again in the direction indicated by the arrow Z. Base substrate 1, waveguides 32, 33, and first and second pyramid mirrors 36, 37 thus combined make up optical waveguide substrate 38. On base substrate 1 above second pyramid mirror 37, there is mounted optical component 42 which supports on its surface facing second pyramid mirror 37 light-emitting element 39 and metal reflecting film 41 disposed around light-emitting element 39. Metal reflecting film 41 acts to increase the amount of a reflected laser beam. Optical waveguide substrate 38 shown in FIG. 12 is illustrated in a cross section taken along line A—A of FIG. 13.

The method of inspecting an optical waveguide substrate according to the fifth embodiment will be described below with reference to FIG. 14.

First, optical waveguide substrate 38 which is an object to be inspected is placed in a predetermined position in inspecting apparatus 40. In step S51 shown in FIG. 14, a laser beam emitted from laser beam source 11 and passing through half-silvered mirror 31 is deflected in the direction indicated by the arrow X by X-direction scanning galvanometer mirror 12, and is then deflected in the direction indicated by the arrow Y by Y-direction scanning galvanometer mirror 13, and applied in the direction indicated by the arrow Z to optical waveguide substrate 38. The laser beam from Y-direction scanning galvanometer mirror 13 is converted by lens 34 into parallel beam 18 having a beam spot diameter of about 1 mm, which is applied along optical axis 19 in the direction indicated by the arrow Z to slanted surface 36A of first pyramid mirror 36. The laser beam is directed by slanted surface 36A to travel in the direction indicated by the arrow X or within the XY plane, and is applied to end face 33A of inspecting optical waveguide 33.

In step S52, the laser beam which has been conducted through inspecting optical waveguide 33 is emitted from other end face 33B of inspecting optical waveguide 33, and directed by slanted surface 37A of second pyramid mirror 37 to travel again in the direction indicated by the arrow Z.

In step S53, the emitted laser beam is reflected by light-emitting element 39 of optical component 42 which faces second pyramid mirror 37 to travel backwards. The reflected laser beam is directed by slanted surface 37A of second pyramid mirror 37 to travel again in the direction indicated by the arrow X into other end face 33B of inspecting optical waveguide 33.

In step S54, the laser beam which has traveled back through inspecting optical waveguide 33 is emitted from end face 33A of inspecting optical waveguide 33. The emitted laser beam is directed by slanted surface 36A to travel again in the direction indicated by the arrow Y.

In step S55, the emitted laser beam is directed by X-direction scanning galvanometer mirror 12 and Y-direction scanning galvanometer mirror 13 to half-silvered mirror 31, which reflects the laser beam to light detector 35. Light detector 35 detects the amount of light returned from optical component 42 to inspect any positional deviation of optical component 42 mounted on base substrate 1. If optical component 42 is mounted in a position displaced from the desired position on base substrate 1, then the laser beam emitted from second pyramid mirror 37 is displaced off light-emitting element 39 of optical component 42, but is applied to metal reflecting film 41, so that the amount of light detected by light detector 42 increases. Therefore, the distance by which mounted optical component 42 is displaced off position can be inspected by confirming the magnitude of the amount of light detected by light detector 42.

According to the above method of inspecting a mounted optical component, a positional displacement of optical component 42 can be inspected with a simple arrangement because the laser beam emitted from other end face 33B of inspecting optical waveguide 33 on optical waveguide substrate 38 is reflected by light-emitting element 39 of optical component 42 and the returned amount of reflected light is detected by light detector 35. Heretofore, it has been customary to apply an alignment mark to an optical component and observe the alignment mark with a high-resolution infrared camera to inspect a positional displacement of optical component. However, such a conventional inspecting process has entailed an increased cost.

With the method according to the fifth embodiment, since the positioning accuracy of an optical component can be confirmed in advance, the quality of an assembly including the optical component which is mounted in position can be improved. For example, optical devices are prevented from becoming judged as defective by removing mounted optical components which are largely displaced off position from the optical devices. Alternatively, an optical component may be temporarily mounted in position at first, then its positional displacement may be inspected, and then the optical component may finally be mounted in order to eliminate the inspected positional displacement.

As described above, because the laser beam emitted from inspecting optical waveguide 33 on optical waveguide substrate 38 is reflected by light-emitting element 39 of optical component 42 and the returned amount of reflected light is detected by light detector 35, a positional displacement of optical component 42 can be inspected with a simple arrangement.

In the above embodiments, the optical waveguide substrate used in the method comprises an optical waveguide disposed on a substrate. However, the optical waveguide substrate used in the method may comprise an optical waveguide embedded in a substrate. The laser beam applied to the lens may be replaced with a laser beam converged by an optical system combined with the laser beam source and emitted from the lens to the optical waveguide. If the laser beam converged by an optical system combined with the laser beam source is used, the lens may be dispensed with. The stored data and the detected result data which are shown in FIGS. 3 and 4 are given by way of illustrative example only, and may be changed as desired depending on the purpose and application of the method according to the present invention.

While preferred embodiments of the present invention have been described in specific terms, such description is for illustrative purposes only, and it is to be understood that changes and variations may be made without departing from the spirit or scope of the following claims.

What is claimed is:

1. A method of inspecting an optical waveguide substrate having a substrate and an optical waveguide mounted on the substrate and having a first mirror surface on one end face thereof and a second mirror surface on another end thereof, said method comprising the steps of:

applying a laser beam to said one end face in a direction perpendicular to a surface of said optical waveguide, and directing, with said first mirror surface, said laser beam to travel in a direction parallel to the surface of said optical waveguide through said optical waveguide;

directing, with said second mirror surface, the laser beam emitted from said other end face of said optical waveguide to travel in a direction perpendicular to the surface of said optical waveguide;

detecting, with an imaging device, the laser beam directed and emitted from said other end of said optical waveguide, and outputting, from said imaging device, detected image information representative of light spot positions to a light spot position confirming device; and comparing said detected image information with reference image information stored in said light spot position confirming device, with said light spot position confirming device, to determine whether an amount of light conducted through said optical waveguide is acceptable or not.

2. A method of inspecting an optical waveguide substrate having a substrate, an optical waveguide mounted on the substrate, a first pyramid mirror mounted on the substrate at one end face of said optical waveguide, and a second pyramid mirror mounted on the substrate at another end face of said optical waveguide, said method comprising the steps of:

applying a laser beam to said first pyramid mirror in a direction perpendicular to a surface of said optical waveguide, and directing, with said first pyramid mirror, said laser beam to travel in a direction parallel to the surface of said optical waveguide, from said one end face into and through said optical waveguide;

directing, with said second pyramid mirror, the laser beam emitted from said other end face of said optical waveguide to travel in a direction perpendicular to the surface of said optical waveguide;

detecting, with an imaging device, the laser 10 beam directed and emitted from said other end of said optical waveguide, and outputting, from said imaging device, detected image information representative of light spot positions to a light spot position confirming device; and comparing said detected image information with reference image information stored in said light spot position confirming device, with said light spot position confirming device, to determine whether an amount of light conducted through said optical waveguide is acceptable or not.

3. A method of inspecting an optical waveguide substrate having a substrate and an optical waveguide mounted on the substrate and having a first mirror surface on one end face thereof and a second mirror surface on another end thereof, said method comprising the steps of:

moving a lens positioned in a terminal portion of the path of a laser beam in a laser beam scanning optical system to deflect the direction in which the laser beam travels;

applying said laser beam to said one end face in a direction perpendicular to a surface of said optical waveguide, and directing, with said first mirror surface, said laser beam to travel in a direction inclined to the surface of said optical waveguide through said optical waveguide;

directing, with said second mirror surface, the laser beam emitted from said other end face of said optical waveguide to travel in a direction perpendicular to the surface of said optical waveguide;

detecting, with an imaging device, the laser beam directed and emitted from said other end of said optical waveguide, and outputting, from said imaging device, detected image information representative of light spot positions to a light spot position confirming device; and comparing said detected image information with reference image information stored in said light spot position confirming device, with said light spot position confirming device, to determine whether an amount of light conducted through said optical waveguide is acceptable or not.

4. A method of inspecting an optical waveguide substrate having a substrate, an optical waveguide mounted on the substrate, a first pyramid mirror mounted on the substrate at one end face of said optical waveguide, and a second pyramid mirror mounted on the substrate at another end face of said optical waveguide, said method comprising the steps of:

moving a lens positioned in a terminal portion of the path of a laser beam in a laser beam scanning optical system to deflect the direction in which the laser beam travels;

applying said laser beam to said first pyramid mirror in a direction perpendicular to a surface of said optical waveguide, and directing, with said first pyramid mirror, said laser beam to travel in a direction inclined to the surface of said optical waveguide through said optical waveguide;

directing, with said second pyramid mirror, the laser beam emitted from said other end face of said optical waveguide to travel in a direction perpendicular to the surface of said optical waveguide;

detecting, with an imaging device, the laser beam directed and emitted from said other end of said optical waveguide, and outputting, from said imaging device, detected image information representative of light spot positions to a light spot position confirming device; and comparing said detected image information with reference image information stored in said light spot position confirming device, with said light spot position confirming device, to determine whether an amount of light conducted through said optical waveguide is acceptable or not.

* * * * *